June 9, 1936.  O. WITTEL  2,043,914

INDICATING DEVICE FOR FILM MAGAZINES

Filed Oct. 7, 1933  2 Sheets-Sheet 1

Inventor:
Otto Wittel,
By George A. Gillette, Jr.
Attorneys

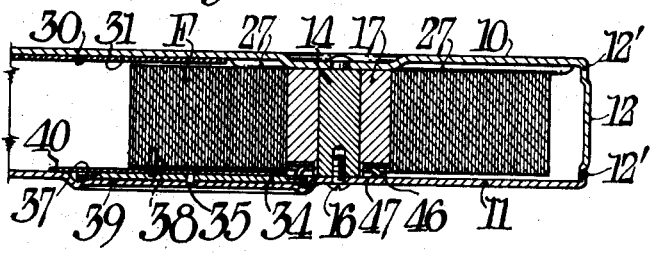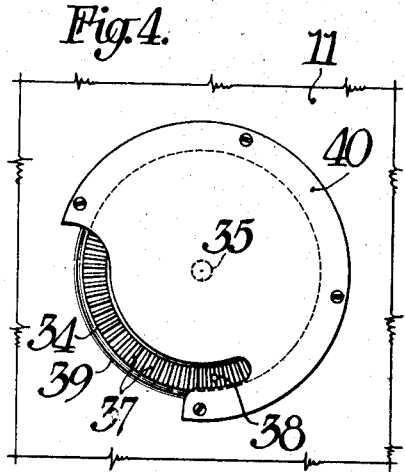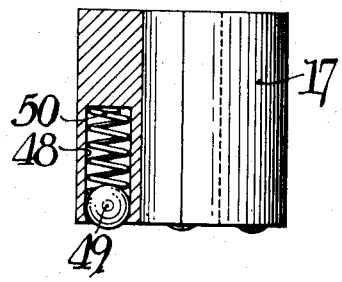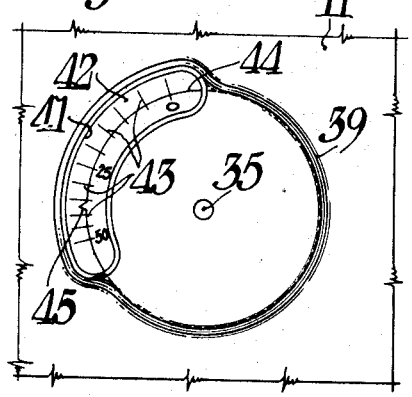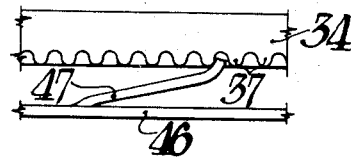

Patented June 9, 1936

2,043,914

UNITED STATES PATENT OFFICE 2,043,914

INDICATING DEVICE FOR FILM MAGAZINES

Otto Wittel, Rochester, N. Y., assignor to Eastman Kodak Company, Rochester, N. Y., a corporation of New York Application October 7, 1933, Serial No. 692,668

20 Claims. (Cl. 33—172)

The present invention relates to an indicating device for strip material and more particularly to a footage indicator for designating the length of film on a film roll within a magazine.

Various types of indicating means have been proposed for the purpose of indicating the amount of film on a film roll within a magazine. The indicating device of the present invention belongs to that general class of footage indicators which include an element, arm or a projection in contact with the outer convolution of the strip material or film roll. The prior art contains many examples of this type of footage indicator but in each instance of the prior art the aforementioned element or projection is held against said outer convolution of the roll of strip material or of the film roll by means of springs or counterweights. The provision of such springs or counterweights, of course, increases the cost of the indicator and at the same time introduces complication of design.

The primary object of the present invention is the provision of an indicating means in which the element adapted to contact the outer convolution of the roll is moved into such contact by rotation of the roll.

Another object of the present invention is the provision in an indicator of a clutch means which rotates with the roll and which actuates a member to hold an element or projection against the outer convolution of the roll thereby to insure accuracy of the footage indications.

A still further object of the present invention is the provision in a footage indicator of a clutch means which may operate an index member or a graduated member and move an element against the outer convolution of the roll, said clutch means being in frictional engagement either with said index member or graduated member and being slidable with respect thereto to permit relative movement between the roll and member so that the element is continually maintained against the outer convolution of the roll.

Still another object of the present invention is the provision in a footage indicator of a clutch means including a plurality of resilient members which engage a roughened surface on a member of the indicating means and which provide a drag on the roll to prevent accidental or undesired unwinding thereof.

Other and further objects of the invention will be apparent to those skilled in the art as the disclosure of my invention proceeds hereinafter.

The aforementioned objects of the invention are embodied in an indicator which includes an index member and a graduated member relatively movable with respect to each other, a projection on one of said members and adapted to contact the outer convolution of the roll, and a means moved by the roll and for moving one of said members to bring said projection against the outer convolution of the roll. The last mentioned means may be characterized as a clutch means and makes frictional engagement either with the index member or graduated member. The construction of such clutch means may vary but two specific forms thereof are herein disclosed. This clutch means not only functions to turn either the index member or graduated member to bring the projection against the outer convolution of the roll but is also slidable over those members to maintain said projection against the outer convolution and to form a drag on the roll to prevent undesired unwinding which may be caused by the inherent resiliency of the strip material, such as a film, in the roll.

Reference is hereby made to the accompanying drawings in which like reference characters designate similar elements and in which:

Fig. 3 is a fragmentary cross section through the indicating device on a film magazine and is taken on the line 3—3 of Fig. 1.

Fig. 4 is a fragmentary plan view of the inner side of the magazine cover and illustrates the provision of a mask on the cover for the prevention of light leakage.

Fig. 5 is a detail of a modified form of film core shown partially in cross section.

Fig. 6 is a fragmentary plan view of the magazine illustrating a modified form of index member and graduated member.

Fig. 7 is a detail to enlarged scale of the roughened or irregular surface on the movable member of the indicating means and illustrates the sliding frictional engagement between the clutch means and roughened surface.

Figure 1:
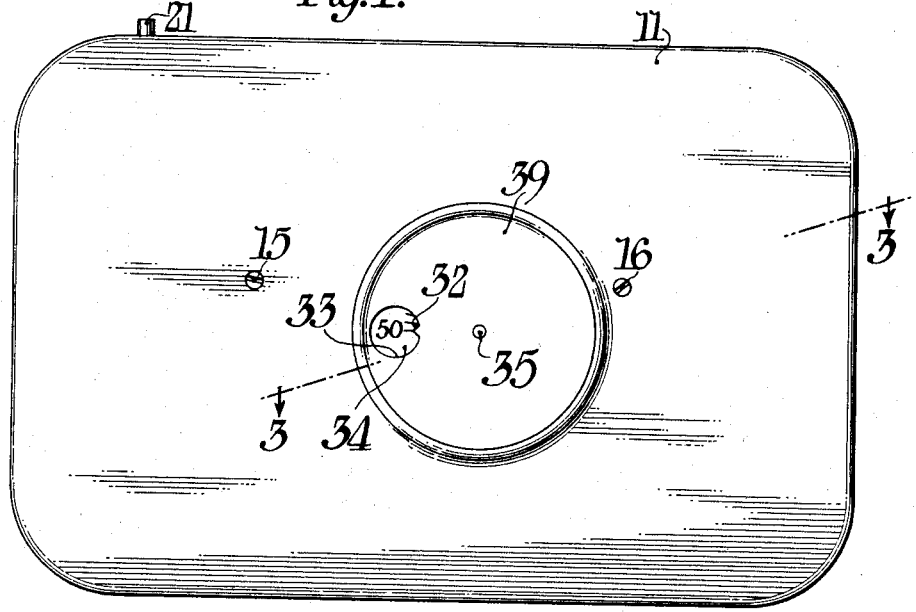
Fig. 1 is a plan view of a film magazine provided with the indicating device of the present invention.

Although the invention is described with respect to the supply roll of a film magazine, it is understood that the invention is not limited to use on a film magazine or to use in connection only with the supply roll of such a film magazine.

In the illustrated embodiment of the invention, the film magazine comprises a casing which is composed of a side wall 10, a side wall 11, constituting the cover of the magazine, and an edge wall 12 which extends around the edges of the side wall 10. The edge wall 12 is provided with offset portions 12', see Fig. 3, which prevent the central areas of the film from making surface contact with the edge wall 12. The offset portion 12' on the edge of wall 12 engages the rim of cover 11 in light tight relation shown in Fig. 3. Spindles 13 and 14 are riveted to side wall 10 in the manner shown with respect to spindle 14 in Fig. 3. The other ends of spindles 13 and 14 are fastened to cover 11 by means of bolts 15 and 16. A film core 17 is rotatably mounted on a spindle 14 and carries a film roll F while a film core 18 is rotatably mounted on spindle 13 and is adapted to support the take-up film roll F'.

Although constituting no part of the present invention the gate and slide structure of the magazine will now be described. An auxiliary strip 19 is fastened to the edge wall 12 of the magazine and is spaced with respect thereto. A flexible slide 20 is located between the edge wall 12 and auxiliary strip 19. A pin 21 is attached to flexible slide 20 and extends through the edge wall 12 so that the flexible slide 20 may be moved in a known manner to cover or uncover the exposure aperture 22 provided in the front wall of the magazine. A plate 23 is fastened to side wall 10 and supports a pair of tapered pins 24. A presser member 25 is located along the front wall of the magazine and is held in position by a spring member 26. The spring member 26 engages the tapered pins 24 and the rear surface of presser member 25 and is provided with a tail 26' for preventing buckling of the film along the lower wall of the magazine.

A plurality of elongated formings 27 are provided in side wall 10 of the magazine casing and extend inwardly to form bearing surfaces for the edges of the film on the film rolls F and F'. A sprocket 28 is rotatably mounted within the magazine and has a plurality of rollers 29 located around the periphery thereof. The sprocket 28 is driven in a known manner by a prime mover external to the magazine and is provided with a gear (not shown) meshing with a pinion gear 30 which is rotatably mounted on side wall 10 by a stud 31. The pinion gear 30 also meshes with a gear (also not shown) but which is adapted to drive the take-up film core 18. The path of the films through the magazine is as follows, from supply roll F around sprocket 28, in a loop encircling the take-up film roll F' and through the gate composed of auxiliary strip 19 and presser member 25, in a loop at the lower right corner of the magazine and again around sprocket 28 to the take-up film roll F'. The path of the film, provision of the gears, and manner of driving the take-up core 18 are more fully described and disclosed in my copending application, Serial No. 620,176, filed June 30, 1932 for a Method and apparatus for feeding motion picture film.

The length of strip material or film remaining on the roll is determined by noting the relative position of two members. These two members are an index member and a graduated member which together comprise an indicating means. According to the preferred embodiment of the invention the index member comprises a pointer 32 which extends into a window opening 33 in the cover 11 of the magazine. The graduated member is preferably composed of a circular disc 34 which is rotatably mounted on the cover 11 by a pin 35. A plurality of calibrated graduations 36 are engraved in one surface of circular disc 34. The reverse side of disc 34 is best illustrated in Fig. 4 and is provided with a roughened surface preferably composed of a plurality of radial corrugations 37 which are annularly located. An element adapted to contact the outer convolution of supply film roll F is also located on this surface of circular disc 34. Such an element is preferably constituted of a projection 38 which extends perpendicularly from the roughened or serrated surface of disc 34.

It is pre-eminently desirable to render the film magazine as compact as possible. Consequently, rather than increase the thickness of the magazine to provide clearance throughout the casing for the rotatable member of the indicating means, a circular forming 39 is provided in the cover 11 and the circular disc 34 is rotatably mounted within forming 39 by the pin 35. The provision of window opening 33 in the cover 11 of the magazine introduces the possibility of light leakage past the disc 34 into the interior of the film magazine. Therefore, a mask 40, see Fig. 4, is riveted to cover 11 to prevent light leakage but is cut away so as to permit free movement of disc 34 through the desired range.

A reversal of the elements constituting the indicating means is within the scope of the invention. Such modification of the indicating means, see Fig. 6, comprises the provision in the cover 11 of an arcuate window opening 41 covered by a transparent medium 42 which is provided with a plurality of calibrated graduations 43. The rotatable member in this case comprises a circular disc 44 rotatably mounted in the circular forming 39 by means of a pin 35. A pointer 45 is located on the periphery of circular disc 44 and is adapted to register with the calibrated graduations 43 on the transparent medium 42.

The element or projection 38 on the movable disc member is moved to and maintained against the outer convolution of the film roll by a means which is movable upon rotation of the film roll and which makes frictional engagement or sliding frictional engagement with the movable member or disc of the indicating means. Such a means has the characteristics of a clutch in transmitting these movements and is illustrated as composed of a plurality of resilient members making frictional engagement with the roughened surface or corrugations on the surface of the movable or rotatable disc. Specifically the preferred form of this means comprises a ring 46 attached to one end of the film core 17 and a plurality of resilient arms 47 bent out of the plane of ring 46 and extending in a direction opposite to the normal rotational direction of the supply film roll F.

Figure 2:
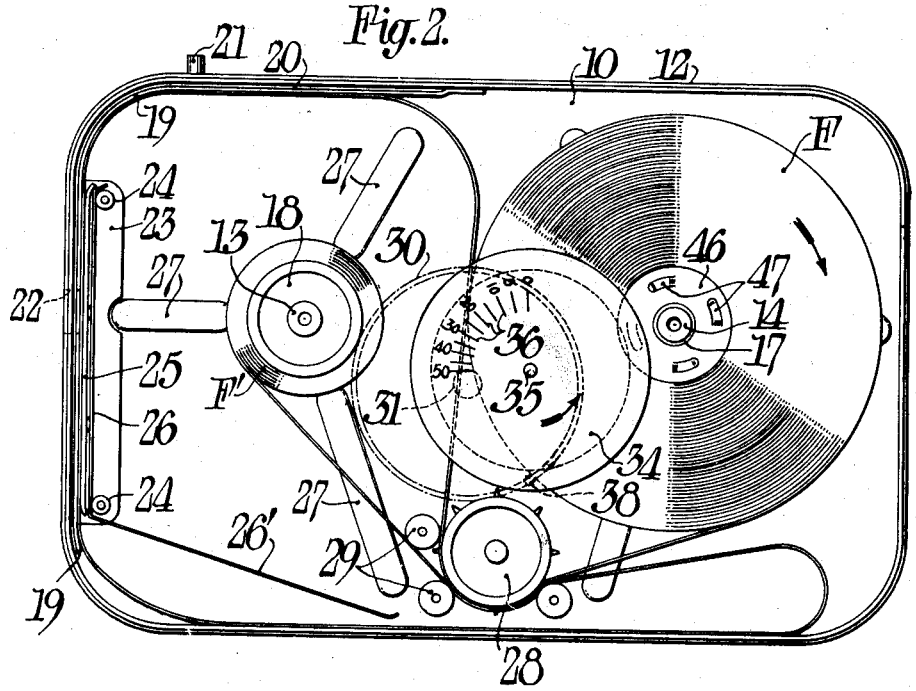
Fig. 2 is a plan view of the film magazine with the cover removed and with the movable member of the indicating means shown in position relative to the film roll and the means movable with the film roll.

It is obvious that upon unwinding of the film from the supply roll F, film core 17, ring 46 and resilient arms 47 will be rotated in the direction indicated by the arrow of Fig. 2. Since the movable member or disc 34 of the indicating means is in juxtaposition to the supply film roll F and the resilient arms 47, said member or disc 34 will be moved by the arms 47 in the direction indicated by the arrow on disc 34 in Fig. 2. Thus rotation of film roll F causes rotation of disc 34 to move projection 38 against the outer convolution of film roll F. At the same time the calibrated graduations 36 on disc 34 are moved with respect to the pointer 32 so that a reading of the film length remaining on the supply film roll F may be taken. Since the total range of the rotatable member of the indicating means is approximately only a quadrant, it is apparent that the resilient arms 47 must be able to slide over the roughened or corrugated surface of disc 34. Therefore upon continued rotation of supply film roll F resilient arms 47 slide over the corrugations 37 but constantly tend to rotate disc 34 so that projection 38 is at all times in contact with the outer convolution of the film roll F. As a result the reading of the indicating means will always give accurate indication as to the length of film remaining on the film roll F.

It is well recognized that a film roll contains a certain amount of resiliency so that the convolutions of a film roll have a tendency to separate or cause unwinding of the roll. An added advantage of the indicating device of the present invention is that the friction drag between resilient arms 47 and the corrugations 37 tends to prevent this undesired unwinding of film roll F. Furthermore this friction drag between the corrugations 37 and resilient arms 47 opposes and tends to prevent any reverse rotation of the supply film core 17. Such reverse rotation, while not ordinarily present in a film magazine, may be promoted during shipment of the magazine or may be present as a result of the manner of advancing the film through the magazine.

The means for transmitting the motion of the supply film roll F to the movable member or disc 34 of the indicating means may vary in the detail of construction. Another form of such means is illustrated in Fig. 5 and comprises a plurality of holes 48 provided in quadrature in the ends of film core 17 and each containing a ball 49 and a coil spring 50. The end surface of film core 17 is stamped to restrict the ends of holes 48 so that the balls 49 cannot be entirely expelled from holes 48 by coil spring 50.

The indicating device of the invention is simple in construction, accurate in operation and performs the additional function of preventing undesired unwinding of the supply film roll. The scope of the invention is not to be limited by the specific embodiments of the various elements shown in the accompanying drawing but is rather to be determined by the appended claims.

Having now particularly described my invention what I desire to secure by Letters Patent of the United States and what I claim is:

1. In a device for measuring the length on a roll of strip material, the combination with an indicating means including an index member and a graduated member which are relatively movable with respect to each other, and an element connected to one of said members and for contacting the outer convolution of strip material on said roll, of a means movable with said roll of strip material and for moving the member to which said element is connected to hold said element against the outer convolution of said roll.

2. In a device for measuring the length on a roll of strip material, the combination with an indicating means including an index member and a graduated member which are relatively movable with respect to each other, and an element connected to one of said members and for contacting the outer convolution of strip material on said roll, of a means movable with said roll of strip material and in frictional engagement with the member to which said element is connected for moving and maintaining said element against the outer convolution of said roll.

3. In a device for measuring the length on a roll of strip material, the combination with an indicating means including an index member and a graduated member, one of said members being movably mounted for relative movement with respect to the other member, and a projection connected to the movable member and for contacting the outer convolution of strip material on said roll, of a means moved by rotation of said roll and in sliding frictional engagement with said movable member of the indicating means and for moving said element against the outer convolution of said roll but permitting relative movement of said means with respect to said movable member.

4. In a device for measuring the length on a roll of strip material, the combination with an indicating means including an index member and a graduated member, one of said members being rotatably mounted for relative movement with respect to the other member, and an element connected to the rotatable member and for contacting the outer convolution of strip material on said roll, of a clutch means rotatable with said roll of strip material and for rotating said rotatable member to hold said element against the outer convolution of said roll.

5. In a device for measuring the length on a roll of strip material, the combination with an indicating means including an index member and a graduated member, one of said members being rotatably mounted for relative movement with respect to the other member, and a projection on said rotatable member and for contacting the outer convolution of strip material on said roll, of a clutch means rotatable with said roll of strip material and for rotating said rotatable member to hold said projection against the outer convolution of said roll.

6. In a device for measuring the length on a roll of strip material, the combination with an indicating means including an index member and a member provided with calibrated graduations, one of said members being circular and rotatably mounted for relative movement with respect to the other member and in juxtaposition to said roll of strip material, and a projection on said circular member and for contacting the outer convolution of said strip material, of a clutch means rotatable with said roll and for rotating said circular member to hold said projection against the outer convolution of said roll.

7. In a device for measuring the length on a roll of strip material, the combination with an indicating means including an index member and a member provided with calibrated graduations, one of said members being rotatably mounted for relative movement with respect to the other member and being provided with a serrated ring, and a projection on said rotatable member and for contacting the outer convolution of said strip material, of a clutch means rotatable with said roll and for engaging the serrated ring on said rotatable member to hold said projection against the outer convolution of said roll.

8. In a device for measuring the length of a film roll, the combination with an indicating means including an index member and a graduated member, one of said members being rotatably mounted for relative movement with respect to the other member and being provided with a friction surface, and a projection on the rotatable member and for abutting the outer convolution of said film roll, of an engaging means moved by rotation of said film roll and including a plurality of resilient arms which engage said friction surface on said movable member to move said projection against the outer convolution of said film roll and which slide over said friction surface with sufficient friction to maintain said projection against said outer convolution.

9. In a device for measuring the length of a film roll, the combination with an indicating means including an index member and a graduated member, one of said members being rotatably mounted for relative movement with respect to the other member and being provided with an irregular surface, and a projection on the rotatable member and for abutting the outer convolution of said film roll, of an engaging means moved by rotation of said film roll and including a plurality of resilient arms which engage said irregular surface on said movable member to move said projection against the outer convolution of said film roll and which cooperate with said irregular surface to present a friction drag for preventing reverse rotation of said film roll.

10. In a device for measuring the length of a film roll, the combination with a core rotatably mounted for supporting said film roll, an indicating means including an index member and a graduated member, one of said members being rotatably mounted for relative movement with respect to the other member and being provided with a ring of corrugations, and a projection on said rotatable member and for contacting the outer convolution of said film roll, of a plurality of spring arms on the end of said core for engaging said corrugations and rotating said member to move said projection against the outer convolution of said film roll upon rotation of said core.

11. In a device for measuring the length in a film roll, the combination with a core rotatably mounted for supporting said film roll, an indicating means including an index member and a graduated member, one of said members being rotatably mounted for relative movement with respect to the other member and being provided with a ring of corrugations, and a projection on said rotatable member and for contacting the outer convolution of said film roll, of a plurality of balls which are spring pressed to protrude from the end of said core and which engage the corrugations on said movable member.

12. In a device for designating the length of film on a roll within a film magazine, the combination with a casing having side walls, one of which is provided with a forming, an indicating means including an index member and a graduated member, one of said members being rotatably mounted in the forming of said casing for relative movement with respect to the other member, and a projection on the rotatable member and for contacting the outer convolution of the film roll, of a clutch means rotatable with said film roll and for engaging said rotatable member to hold said projection against the outer convolution of said film roll.

13. In a device for designating the length of film on a roll within a film magazine, the combination with a casing having side walls, one of which is provided with a circular forming, an indicating means including an index member and a graduated member, one of said members being circular and rotatably mounted on one of said side walls within said circular forming for relative movement with respect to the other member, and a projection on the circular member and for contacting the outer convolution of the film roll, of a clutch means rotatable with said film roll and for engaging said circular member to hold said projection against the outer convolution of said film roll.

14. In a film magazine, the combination with a casing having side walls, a core rotatably mounted between said side walls and for supporting a film roll, a film footage indicating means including an index member and a graduated member, one of which is movably mounted on one of said side walls for relative movement with respect to the other member, and a projection on said movable member and for contacting the outer convolution of the film roll, of a means on said core and for engaging said movable member and upon rotation of the film core for moving said projection on said movable member into contact with the outer convolution of the film roll.

15. In a film magazine, the combination with a casing having side walls, a core rotatably mounted between said side walls and for supporting a film roll, a film footage indicating means including an index member and a graduated member, one of which is movably mounted on one of said side walls for relative movement with respect to the other member, and a projection on said movable member and for contacting the outer convolution of the film roll, of a plurality of resilient members on said core and for engaging said movable member and upon rotation of said film core for moving said projection on said movable member into contact with the outer convolution of the film roll.

16. In a film magazine, the combination with an indicating means including an index member and a graduated member, a casing having a side wall upon which one of said members is movably mounted for relative movement with respect to the other and which is provided with a window for observation of the relative position of said member, a film core rotatably mounted in said casing and for supporting a film roll, and a projection on said movable member and adapted to engage the outer convolution of said film roll, of an engaging means on said film core and in frictional engagement with said movable member and for moving the projection on said movable member into contact with the outer convolution of the film roll upon rotation of said film core.

17. In a film magazine, the combination with a casing having side walls, a core rotatably mounted between said side walls and for supporting a film roll, an indicating means including an index member and a graduated member, one of which is rotatably mounted on one of said side walls for relative movement with respect to the other member and which is provided with a roughened surface, and a projection on said movable member and for engaging the outer convolution of the film roll, of a plurality of resilient members on the film core, for engaging said roughened surface on said movable member to move said projection against said outer convolution upon rotation of said film core.

18. In a film magazine, the combination with a light tight container having side walls and adapted to contain a film roll, and a recessed portion in one of said side walls and including a rim offset with respect to said side wall, said recessed portion being provided with an opening, of an indicating means including a disc member movable within said recessed portion and covering said opening, the edges of said disc being adjacent to the off-set rim of said recessed portion to constitute a light sealing joint.

19. In a film magazine, the combination with a light tight container having side walls and adapted to contain a film roll, and a recessed portion in one of said side walls and including a rim offset with respect to said side wall, said recessed portion being provided with an opening, of an indicating means including a disc member movable within said recessed portion and covering said opening, the edges of said disc adjoining the off-set rim of said recessed portion to constitute a light sealing joint, and including an index mark and a plurality of graduations in said opening and on said disc member.

20. In a film magazine, the combination with a light tight container having side walls and adapted to contain a film roll, and a recessed portion in one of said side walls and including a rim offset with respect to said side wall, said recessed portion being provided with an opening, of an indicating means including a disc member movable within said recessed portion and covering said opening, the edges of said disc being adjacent to the off-set rim of said recessed portion to constitute a light sealing joint, and including a projection on said disc member extending into said container for contacting said film roll.

OTTO WITTEL.